(No Model.) 2 Sheets—Sheet 1.
C. N. FISHER.
STEERING DEVICE FOR VEHICLES.
No. 606,409. Patented June 28, 1898.
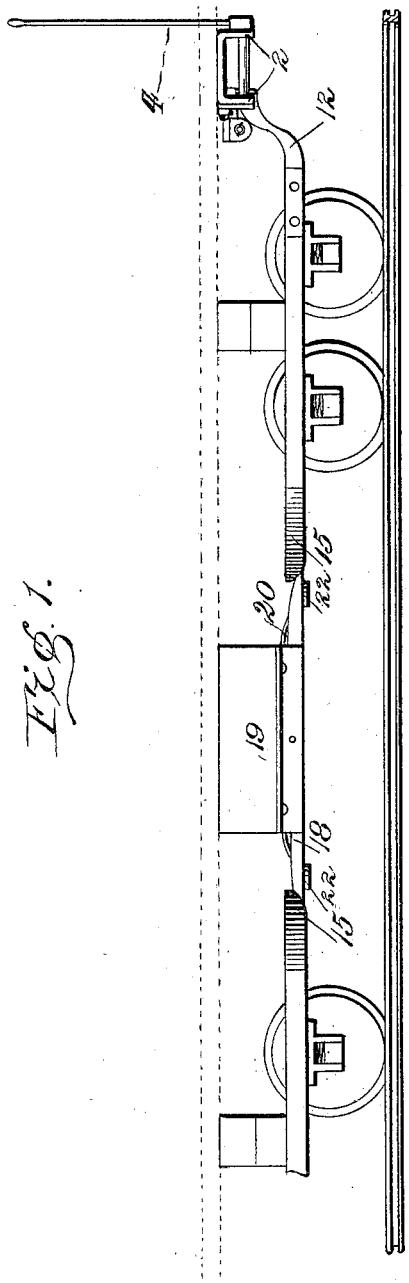
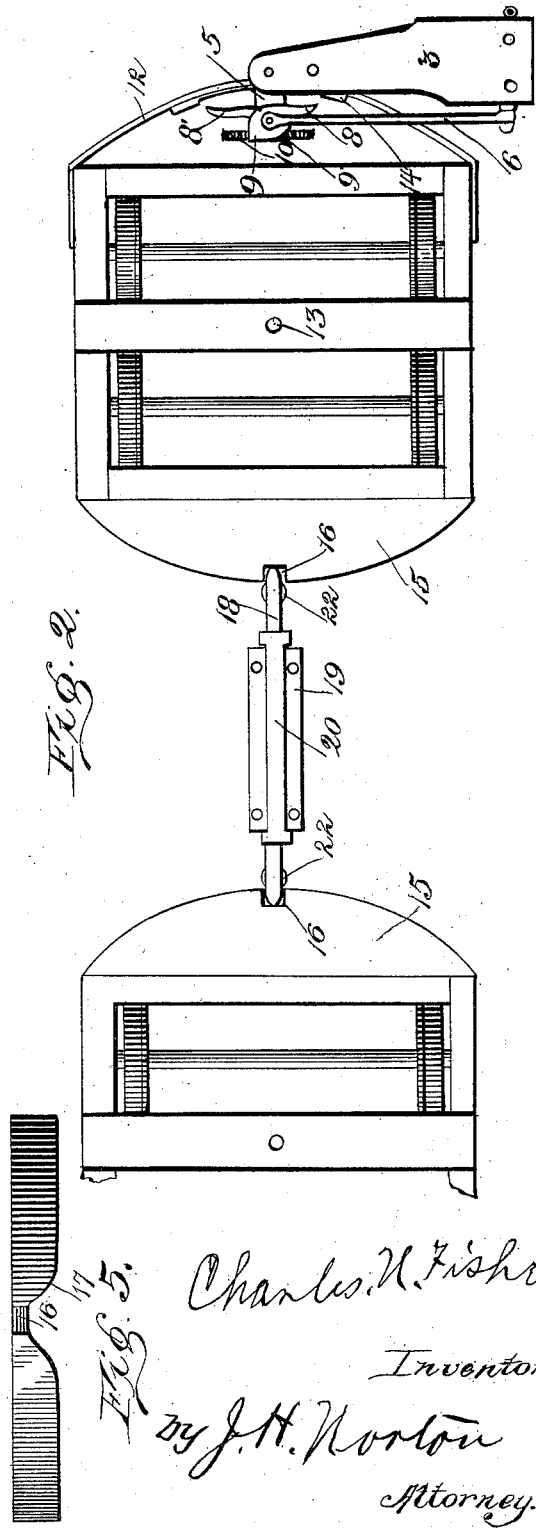
Witnesses.
J. M. Fowler Jr.
L. L. Barton
Charles N. Fisher
Inventor.
by J. H. Norton
Attorney.

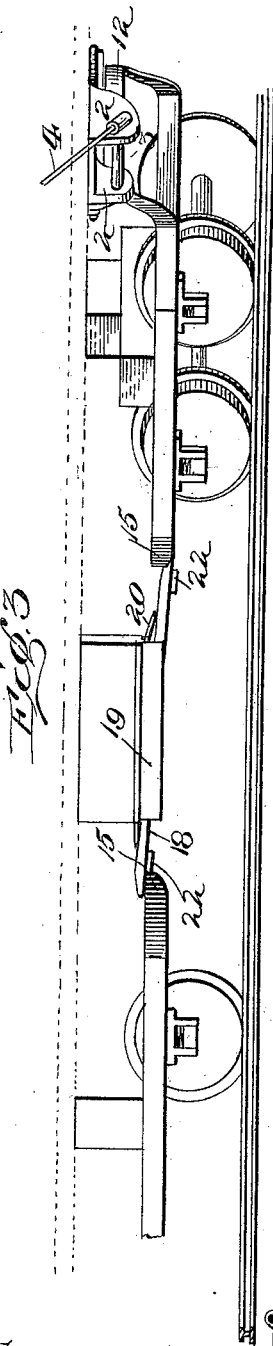
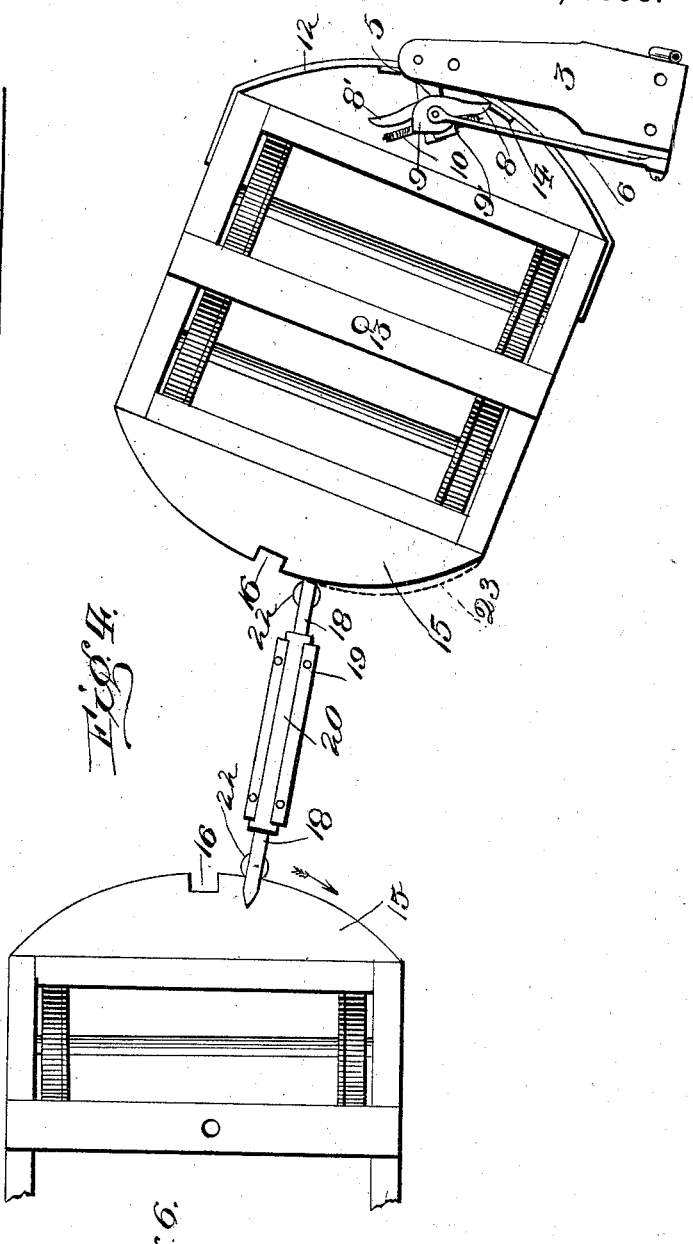
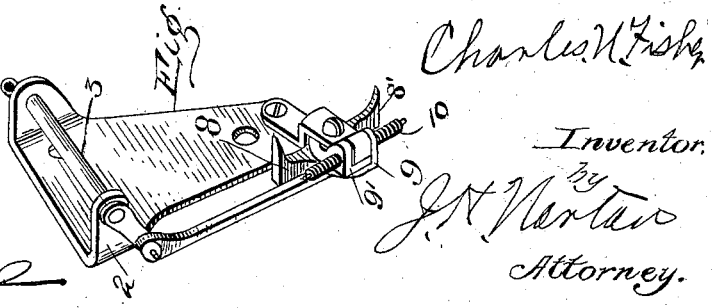

UNITED STATES PATENT OFFICE.

CHARLES NICHOLAS FISHER, OF HOUSTON, TEXAS.

STEERING DEVICE FOR VEHICLES.

SPECIFICATION forming part of Letters Patent No. 606,409, dated June 28, 1898.

Application filed August 17, 1897. Serial No. 648,599. (No model.)

*To all whom it may concern:*

Be it known that I, CHARLES NICHOLAS FISHER, a subject of the Queen of Great Britain, residing at Houston, in the county of Harris and State of Texas, have invented certain new and useful Improvements in Steering Devices for Vehicles; and I do hereby declare the following to be a full, clear, and exact description of the invention, such as will enable others skilled in the art to which it appertains to make and use the same.

My invention relates to steering devices for vehicles wherein the direction of motion of the vehicle is determined by the position of the axles thereof; and it has for its object to provide a construction which is especially applicable to vehicles traveling upon rails, such as tram and railway cars, whereby the vehicles may be caused with certainty to move over any one of a number of diverging tracks without the use of switch-points, which are liable to become obstructed and are otherwise objectionable.

For these purposes my invention consists in certain means actuated by an attendant upon the car for swinging one truck thereof so that the axles of the truck may be moved into a substantially radial position in respect to the curvature of the track to be followed and in a connection whereby the other truck will be swung in the same direction by the turning of the car-body, thus throwing the car around the desired curve.

It also consists in the construction, arrangement, and combination of the several parts of which it is composed, as will be hereinafter more fully described and claimed.

Referring to the accompanying drawings, in which corresponding parts are designated by corresponding marks of reference, Figure 1 is a side view of the running-gear of a car having my invention applied thereto, the car-body being shown in dotted lines. Fig. 2 is a plan view thereof. Fig. 3 is a view similar to Fig. 1, but showing the position of the parts when the front truck is swung and the car-body partly turned. Fig. 4 is a plan view thereof. Fig. 5 is a front elevation of a central extension shown in the preceding figures. Fig. 6 is an inverted perspective view of the swinging mechanism for the front truck.

It will be understood that as it is desirable to have a car capable of running in either direction I prefer to place the hereinafter-described truck-swing mechanism on each end thereof, although it is not essential so to do, nor is it so shown, and that I use the terms "front" truck and "rear" truck merely as means for distinguishing one truck from the other.

Upon the lower surface of the forward end of the floor of the car, below the platform, is fastened a bracket 1, provided with depending ears 2, forming a bearing for the longitudinal crank-shaft 3, which is rocked by a hand-lever 4 or other suitable means extending upwardly through the floor of the car. In the longitudinal axis of the car an arm 5 is pivoted to the bracket and normally extends rearwardly therefrom, the arm being swung from side to side by the crank-shaft 3 through the connecting-rod 6. On the rearward end of the arm are pivoted the dogs, each dog having a nose 8 8', respectively, projecting on one side of the arm and a shoulder 9 9', respectively, projecting on the opposite side of the arm, the shoulders being normally held close against the arm by compression-springs 10, mounted upon the pin 11, passing through the arm and shoulders.

A suitable extension 12 projects forwardly from the front truck and has its forward end curved, it being struck from the pivotal point 13 of the truck, the forward end of the extension being provided on its rear face with shoulders 14. The extension extends sufficiently forward of the truck for its forward end to be in front of the noses of the dogs and to permit it to swing with the truck when the arm 5 is in its normal central position without engagement of the shoulders 14 with the dogs. However, if the arm 5 is swung to one side by the shaft 3 the movement thereof will cause the nose 8 8' upon that side thereof to engage the corresponding shoulder 14 of the truck extension 12, whereby the two will be swung together upon the continued movement of the arm and the truck caused to move upon its pivot to carry the car around a curve, as shown in Fig. 4, the springs 10 permitting this continued movement of the arm. The normal disengagement of the parts just described, however, permits the swinging of a truck without interference by the dogs when the arm carrying the latter is in its normal position.

Each truck has thereon an extension 15, extending toward the center of the car. These extensions will hereinafter be called "central" extensions and are by preference formed nearly on an arc of circle struck from the pivots of their respective trucks, they being slightly flattened at their centers or swelled on each side thereof (this swell being shown greatly exaggerated in dotted lines at 23, Fig. 4) and provided at their center with a peripheral notch 16 in the central line of their respective trucks. The lower surface 17 of each extension is also formed into a cam-track sloping from the center downwardly toward the sides.

In the longitudinal axis of the car, and to the bottom thereof, a lever 18 is centrally pivoted in a guide-bracket 19 to vibrate in a vertical plane, the lever being normally held horizontal by the spring 20. The ends of the lever are beveled, as at 21, and carry on their lower faces rollers 22, the ends of the lever being normally below and in line with the notches 16 in the central extensions of the trucks. When the forward truck has been swung as just described, it is evident that the central extension thereof will also be swung and that the cam-track thereon upon the initial movement thereof will carry down the forward end of the lever 18, throwing the rear end thereof up through the notch 16 in the central extension of the rear truck. Should the swiveling-points 13 be so rigidly connected by the car-body as not to permit a slight longitudinal separation, the rollers 22 may be made of rubber, so as to give slightly as said rollers run upon the high parts of the cam 15. Ordinarily, however, the swiveling-points are sufficiently loose so that the necessity of rubber rollers is obviated and rigid rollers may be used in their stead. The continued movement of the car then carries the central line of the car to one side of the line in which the rear truck is moving, and as the lever 18 lies in this central line the roller on the rear end thereof will travel along the vertical face of the central extension of the truck and, binding on the side swells 24 thereof, will by friction swing such rear truck, when at the diverging-point of the tracks, on its pivot in the direction of the arrow in Fig. 4.

Having thus described my invention, what I claim, and desire to secure by Letters Patent, is—

1. In a vehicle steering device, the combination with a truck having a shouldered curved extension thereon, of a vertically-pivoted arm adapted to swing from side to side, and to engage the said extension to swing the truck, and means for swinging the arm, the arm being so positioned as to be disengaged from the shouldered extension when in its normal position, substantially as described.

2. In a vehicle steering device, the combination with a vertically-pivoted arm, having a nose on each side thereof, of means for swinging the arm from side to side, and a truck provided with a curved extension having shoulders for engagement with a nose upon the arm when the latter is swung to one side, but capable of movement with the truck without engaging the nose when the arm is in its normal position, substantially as described.

3. In a vehicle steering device, the combination with a truck having a shouldered curved extension thereon, of an arm vertically pivoted in front of the extension, and extending to within the circle described thereby, projections upon the sides of the arm adapted to engage the shoulders upon the extension to swing the truck, and means for swinging the arm, substantially as described.

4. In a vehicle steering device, the combination with a truck having a shouldered extension thereon, of a vertically-pivoted arm having spring-pressed dogs thereon adapted to engage the shoulders upon the extension, and means for swinging the arm, substantially as described.

5. In a vehicle steering device, the combination with a truck having a shouldered curved extension thereon, of an arm vertically pivoted in front of the extension and extending to within the circle described thereby, spring-pressed dogs upon the arm, adapted when the arm is swung to engage the shoulders upon the extension, and means for moving the arm, the arm being so positioned that the dogs thereon are disengaged from the shouldered extension when the arm is in its normal position.

6. In a vehicle steering device, the combination with a truck having a shouldered extension thereon, of a vertically-pivoted arm, having a pair of dogs pivoted thereon, each dog having a nose projecting to one side of the arm, and a shoulder upon the other side of the arm, springs holding the shoulders of the dogs against the arm, and means for swinging the arm, substantially as described.

7. The combination with a vehicle-body and a pivoted truck, having a curved bearing-face thereon, of a friction member carried by the vehicle-body and adapted by friction upon the curved bearing-face on the truck to swing the latter when the vehicle-body is turned thereon, substantially as described.

8. The combination with a vehicle-body and two pivoted trucks, each having an extension provided with a bearing-surface on each side of its center, of a lever horizontally pivoted to the vehicle and provided with rollers upon its ends, and means for tilting the said lever upon the swinging of one of the trucks, whereby one of the rollers upon the lever will be placed in position to bear upon the extension of the other truck upon the turning of the car-body thereon, substantially as described.

9. The combination with a vehicle-body and two pivoted trucks, each having an extension provided with a cam-track on its lower face, and a curved bearing-surface, and a central notch, of a lever horizontally pivoted to the vehicle-body, and provided with rollers upon the lower surface of its ends, the ends of the levers being normally below the notches in the said extensions, substantially as described.

10. The combination with a vehicle-body and two pivoted trucks, each having an extension provided with a cam-track on its lower face and a curved bearing-surface flattened at its center and a central notch, of a guide-bracket secured to the body of the vehicle, a lever vertically pivoted in the said bracket and having beveled ends normally located below the notches in the said extensions, and rollers upon the lower surface of the ends of the said levers, substantially as described.

In testimony whereof I affix my signature in presence of two witnesses.

CHAS. NICHOLAS FISHER.

Witnesses:
J. H. MARR,
J. F. TUBBS.